United States Patent [19]
Sabaka
[11] 4,022,355
[45] May 10, 1977

[54] CARTRIDGE FOR CONTAINING AND DISPENSING VISCOUS MATERIAL

[76] Inventor: George Sabaka, Box 123, R.D. 2, New Oxford, Pa. 17351

[22] Filed: Mar. 26, 1976
[21] Appl. No.: 670,652
[52] U.S. Cl. .................................. 222/327; 92/247
[51] Int. Cl.² .......................................... G01F 13/00
[58] Field of Search .................... 92/247, 250, 249; 222/327, 541, 386

[56] References Cited

UNITED STATES PATENTS

| | | | |
|---|---|---|---|
| 3,029,985 | 4/1962 | Kreuger et al. | 222/327 |
| 3,141,583 | 7/1964 | Mapel et al. | 222/327 |
| 3,189,226 | 6/1965 | Sherbondy | 222/541 X |

FOREIGN PATENTS OR APPLICATIONS

| | | | |
|---|---|---|---|
| 655,522 | 7/1951 | United Kingdom | 92/247 |
| 878,456 | 9/1961 | United Kingdom | 92/247 |

*Primary Examiner*—Stanley H. Tollberg
*Assistant Examiner*—Hadd Lane
*Attorney, Agent, or Firm*—Anthony J. Casella; Joseph A. Calvaruso

[57] ABSTRACT

A cartridge for containing and dispensing caulking compound comprises an elongated tubular member, generally cylindrical in configuration, one end of which has a fixed end wall including a dispensing opening therethrough and a spout attached to the end wall, while the other end of the tubular member is closed by a resilient, annular, floating member slidably mounted within the tubular member. The floating member is impervious and is made of a flexible material. When employed in conjunction with a standard caulking gun of the plunger type, the force of the plunger bears directly on the floating member which thereby expands in diameter and decreases in width and transmits pressure to the caulking for dispensing. When the plunger is suddenly withdrawn, the expansion of the floating member effectively absorbs the pressure forces within the cartridge thereby minimizing the amount of undesirable leakage of the caulking from the cartridge.

11 Claims, 5 Drawing Figures

CARTRIDGE FOR CONTAINING AND DISPENSING VISCOUS MATERIAL

BACKGROUND OF THE INVENTION

This invention relates to an improved cartridge for containing and dispensing viscous material such as caulking compound. These cartridges are in widespread use and quite familiar to the average home-owner, who at one time or another must seal or weather-proof a surface in his home.

Generally, the cartridges are comprised of a cylindrical tube having at one end a fixed circular wall. This fixed wall has a discharge opening which is covered by a frangible seal to prevent leakage of the material contained in the tube, and also to prevent the material from being exposed to air before the cartridge is used. A spout or nozzle is attached to the fixed end wall for easy application of the caulking. The other end of the tube is usually closed by a flat circular piston slidably mounted in the tube.

Cartridges are usually used in combination with a dispensing gun having a plunger by which pressure is applied to the material in the tube. The plunger presses against the slidable piston of the tube pushing it through the tube thereby causing the material to discharge.

One shortcoming that has been associated with known dispensing cartridges is the undesirable discharge of material that continues even after the plunger has been withdrawn. This excess discharge is generally caused by pressures built up in the viscous material when the plunger applies a force to it.

Several methods have been devised to cope with this shortcoming. One method employs a cartridge having a shut off nozzle. This cartridge has a fixed end wall and a closure disc carried by the nozzle. Each have a discharge opening formed therein. By rotating the nozzle relative to the fixed end wall the openings are brought into alignment to allow discharge of material. To stop the flow of material the nozzle is rotated so that the discharge openings are not aligned.

Another known cartridge employs valves to control the discharge of material. Depending on whether the valves are open or closed the material in the cartridge may or may not be discharged.

With the above two devices manipulation by means of rotating a nozzle or closing valves is required to stop the flow of material. Though this extra manipulation is only a minor inconvenience it would be preferable for a cartridge to be able to stop the flow of material by merely pulling back the plunger. In addition, it would be preferable to keep the cartridge, as well as the dispensing gun, as simple in construction as possible, having fewer parts that may malfunction or increase the cost of the cartridge.

One device that attempts to accomplish this is a cartridge that uses a flexible member of semi-spherical configuration instead of a flat piston. In opearation the plunger of the gun presses against the semi-spherical member thereby flattening the member. Application of additional pressure forces the member through the tube causing the material therein to be discharged. Theoretically when the plunger is released the forces in the tube act in the direction of the spherical member to restore it to its original configuration, rather than in the opposite direction to force material out of the tube. In practice, however, this device has been found not to be a fool-proof method of preventing unwanted discharge because only a small area of the semi-spherical member is displaced by the pressure of the plunger. Accordingly, only a portion of the energy accumulated in the material is dissipated in restoring the semi-spherical member to its original configuration. In addition, because the semi-spherical member is in tight contact with the inner surface of the cartridge at all times, it is easier for the forces in the viscous material to act to discharge the material than it is to move the semi-spherical member back. As a result the remaining energy causes leakage of the material from the cartridge.

It is an object of the invention to overcome the shortcomings of the prior art and to provide a cartridge for containing and dispensing viscous material which is simple in construction and in which the viscous material will substantially stop flowing when the plunger is pulled, and which does not require rotation or manipulation of additional parts.

It is a further object of this invention to provide a cartridge for containing and dispensing viscous material which is inexpensive to manufacture and simple to operate.

SUMMARY OF THE INVENTION

The subject invention relates to a new and improved cartridge for containing and dispensing a viscous material such as caulking compound. The cartridge is comprised of an elongated tubular member, generally cylindrical in configuration. One end of the tubular member has a fixed end wall, having a dispensing opening therethrough, and a spout attached to the end wall. The other end of the tubular member is closed by a resilient, annular, floating member which is slidably mounted within the tubular member. The floating member is preferably made of sponge rubber, sponge plastic, silastic or other suitable material.

In the preferred embodiment, the floating member has a plurality of annular wipers or scrapers on its outside diameter. When pressure is applied to the floating member, its width decreases and its diameter increases, forcing the annular wipers into tight contact with the inner surface of the tubular member. Further pressure advances the floating member through the tubular member causing the material contained therein to discharge through the spout. When the pressure is removed, the floating member reverts to its original width and diameter thus removing the wipers from tight contact with the inner surface of the tubular member. As a result the pressure accummulated in the material contained in the tubular member acts to push the floating member back. Because it takes less energy to act on the floating member than it does to force the material through the dispensing opening, little or no further discharge of material occurs once the pressure has been removed from the floating member.

DESCRIPTION OF THE PREFERRED EMBODIMENTS

Figure 1:
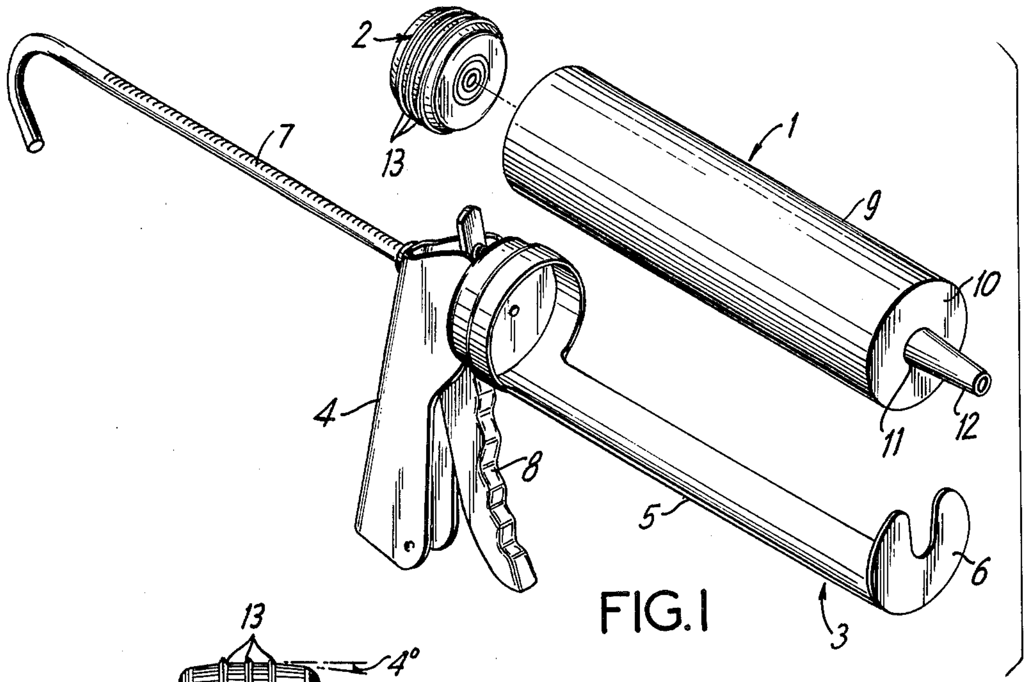
FIG. 1 is an exploded perspective view of the cartridge of the subject invention, the floating member which closes the back end thereof, and the dispensing gun in combination with which the subject cartridge is used.

FIG. 1 is an exploded perspective view of the cartridge 1, floating member 2, and dispensing gun 3 of the subject invention. The dispensing gun 3 is one that is in common use today. It includes a handle 4, an elongated semi-cylindrical chamber member 5 extending forwardly from the handle 4, a front wall 6 fixed to the outer end of the chamber member 5, a plunger 7, and a trigger assembly 8 engageable with the plunger 7 for advancing the plunger 7 in the chamber 5.

The cartridge 1 includes an elongated tubular member 9, generally cylindrical in configuration. This member 9 is standard in existing cartridges and may be made of paperboard, plastic or other suitable material. At one end of the tubular member 9 is a fixed end wall 10 having a dispensing opening 11, covered by a frangible seal. This seal prevents leakage of the viscous material from within the cartridge 1, and also prevents the material from being exposed to air before the cartridge 1 is used. Attached to the fixed end wall 10 is a spout 12 through which the material contained in the cartridge 1 may be discharged. The front end wall 10 and the spout 12 may be made from plastic or any other suitable material.

Figure 2:
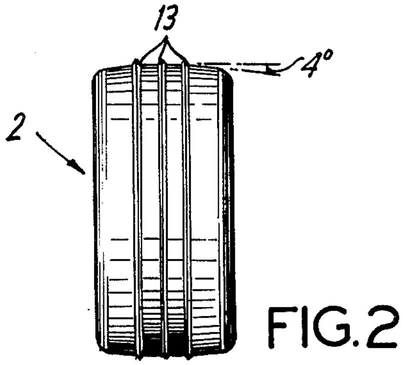
FIG. 2 is a side view of the floating member of the subject invention.
Figure 5:
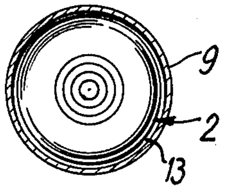
FIG. 5 is a cross-section of the cartridge of the subject invention cut along the line 5—5 in FIG. 3.

The back end of the tubular member 9 is closed by a resilient floating member 2 which is annular in configuration. In one preferred embodiment the floating member 2 is hollow and may be made from plastic, rubber or other suitable material. In another preferred embodiment the floating member 2 may be a collapsible resilient body of sponge plastic, sponge rubber or other similar material. Referring to FIG. 2 the upper and lower surfaces of the floating member 2 may preferably be sloped 4° from the horizontal. This will facilitate entry of the floating member 2 into the cylinder 9.

Further referring to FIG. 2 the floating member 2 has a plurality of annular wipers or seals 13 on its exterior diameter. The function of these wipers will later become apparent.

Figure 3:
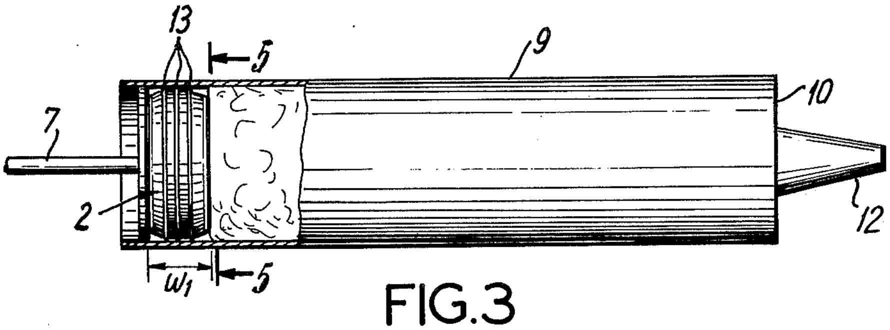
FIG. 3 is a side view of the cartridge of the subject invention, the floating member of which has a width $W_1$.
Figure 4:
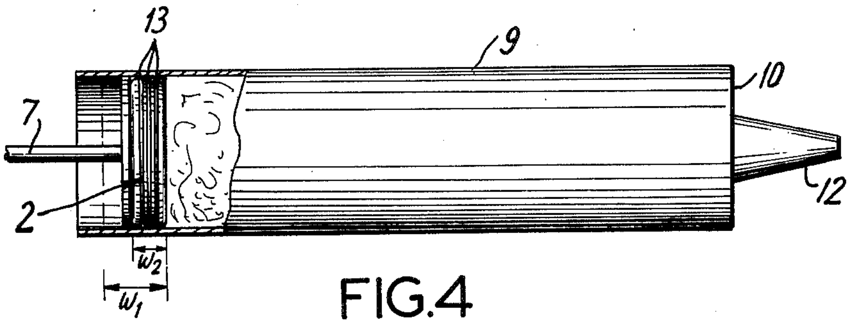
FIG. 4 is a side view of the cartridge of the subject invention wherein pressure is applied to the floating member by means of a plunger, the floating member having been compressed to a width $W_2$.

In operation, when it is desired to use the caulking cartridge 1, the frangible seal of the fixed end wall 10 of the cartridge 1 is punctured, and the cartridge 1 is mounted in the semi-cylindrical chamber member 5 of the dispensing gun 3, with the plunger 7 of the gun 3 bearing against the floating member of the cartridge 2. As depicted in FIG. 3 the floating member 2 has a width $W_1$ before the plunger 7 is actuated. To discharge the material in the cartridge 1, the trigger assembly 8 of the caulking gun 3 is actuated thereby causing the plunger 7 to press against the floating member 2. As a result of its configuration and resilience, the width of the floating member 2 is reduced to $W_2$. Simultaneously, the diameter of the floating member 2 expands, pressing the wipers 13 tightly against the inner surface of the tube 9. Continued force by the plunger 7 advances the floating member 2 through the tube 9, thereby forcing the material in the cartridge 1 to discharge. As the floating member 2 advances through the tube 9 the annular wipers 13 scrape the inner surface of the tube 9 so that all of the material contained therein is advanced as well.

When it is desired to stop the flow of the caulking from the cartridge 1 the plunger 7 of the caulking gun 3 is quickly withdrawn. As a result of the elimination of pressure by the plunger 7, the floating member 2, because of its resilience, reverts to its original configuration having a width $W_1$. Simultaneous to this action, the diameter of the floating member decreases to its original size, thus removing the wipers 13 from tight contact with the inner surface of the tube 9. As a result, the forces accumulated within the material contained in the cartridge 1 can act to move the floating member 2 back. Because it takes less energy to act on the floating member 2 than it does to continue to force the material out the discharge opening 11 and spout 12, little or no further discharge of material occurs. All the energy within the material in the cartridge 1 is dissipated in acting upon the floating member 2.

Although the cartridge 1 of the subject invention is described as having the floating member 2 as an integral part thereof, it is conceivable that the floating member 2 is distinct from the cartridge 1, with the cartridge 1 having merely a frangible seal closing its back end.

In summary, the subject invention provides a new and improved device for containing and dispensing viscous material. It is simple in construction and may be economically manufactured. Because of its construction it effectively eliminates any unwanted discharge of material once the plunger has been withdrawn. Unlike some existing devices no additional parts such as a shut-off nozzle or valves, and consequently no rotation or manipulation thereof is required to effectively control the flow of material. In addition, the subject invention is a more effective means of stopping unwanted discharge than the cartridge employing a semi-spherical piston member. It employs a floating member of such configuration that it is in tight contact with the inner surface of the cartridge only when pressure is being applied to ti by a plunger. When the plunger is withdrawn, the floating member decreases in diameter removing it from tight contact with the cartridge. As a result, it is easier for the forces in the viscous material to move the floating member back than it is to discharge material through the spout. There is virtually complete dissipation of the energy in the viscous material and little or no unwanted discharge through the spout. Further, there is a much greater area of displacement in the floating member of the subject invention than there is in the semi-spherical piston member, and hence greater ability to dissipate the energy in the viscous material.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed is:

1. An improved cartridge for containing and dispensing a viscous material, said cartridge including an elongated tubular member having a cylinderical inner surface, said tubular member having at one end a fixed wall having a dispensing opening therethrough, the improvement comprising a resilient, enclosed member, disposed at the end of said tubular member opposite said fixed wall, said resilient, enclosed member being slidably mounted within said tubular member, said resilient, enclosed member being generally cylindrical in configuration, having substantially parallel side walls, the diameter of said resilient, enclosed member being less than the diameter of said tubular member, such that said resilient, enclosed member is normally not in tight contact with the inner surface of said tubular member, said resilient, enclosed member being air-impervious and collapsible, increasing in diameter and decreasing in width when dispensing pressure from a dispensing gun plunger is applied thereto for selectively placing said resilient, enclosed member in tight contact with the inner surface of said tubular member, and advancing the viscous material through said tubular member and out said dispensing opening, said resilient, enclosed member reverting to its original configuration and normal state of not being in tight contact with the inner surface of said tubular member when the pressure from the plunger is released, whereby pressure forces accumulated in the viscous material act on the resilient, enclosed member to displace it away from the dispensing opening rather than advancing the viscous material through said dispensing opening.

2. An improved cartridge for containing and dispensing a viscous material as in claim 1 wherein the resilient, enclosed member is hollow.

3. An improved cartridge for containing and dispensing a viscous material as in claim 1 wherein the resilient, enclosed member has an annular wiper on its exterior diameter.

4. An improved cartridge for containing and dispensing a viscous material as in claim 1 wherein a plurality of annular wipers are provided on the exterior surface of said resilient, enclosed member.

5. An improved cartridge for containing and dispensing a viscous material as in claim 1 wherein the resilient, enclosed member is made from sponge rubber.

6. An improved cartridge for containing and dispensing a viscous material as in claim 1 wherein the resilient, enclosed member is made from sponge plastic.

7. An improved cartridge for containing and dispensing a viscous material as in claim 1 wherein the resilient, enclosed member is made from silastic.

8. A floating member for use in dispensing a viscous material from a cartridge, said cartridge including an elongated tubular member having a cylindrical inner surface, said tubular member further having at one end a fixed wall having a dispensing opening therethrough, said floating member comprising a resilient, enclosed, hollow member generally cylindrical in configuration, having substantially parallel side walls, said floating member being slidably receivable in said tubular member, said floating member having a diameter less than that of said tubular member such that said floating member is normally not in tight contact with the inner surface of said tubular member when received therein, said energy dissipating member further being air-impervious and collapsible, increasing in diameter and decreasing in width when one of said side walls is placed against the viscous material in the cartridge and the other side wall is subjected to a dispensing force such that the floating member is disposed in tight contact with the inner surface of said tubular member for advancing the viscous material through the cartridge and out the dispensing opening, said floating member reverting to its original configuration and normal state of not being in tight contact with the inner surface of said tubular member when the force is released whereby pressure forces accumulated in the viscous material act on the floating member to displace it away from the dispensing opening rather than advancing the viscous material through said dispensing opening.

9. A floating member as in claim 8 furhter including an annular wiper disposed on its exterior diameter.

10. A floating member as in claim 8 which is made from sponge plastic.

11. A floating member as in claim 8 which is made from sponge rubber.

* * * * *